United States Patent [19]

Nowacki et al.

[11] 4,103,974
[45] Aug. 1, 1978

[54] CABLE CARRIAGE AND SPILL-PLATE HOUSING ASSEMBLY FOR A MINING MACHINE

[75] Inventors: Georg Nowacki, Datteln; Karl-Heinz Weber, Witten-Heven, Rep. of Germany

[73] Assignee: Gebr. Eickhoff, Maschinenfabrik und Eisengiesserie m.b.H., Bochum, Germany

[21] Appl. No.: 741,338

[22] Filed: Nov. 12, 1976

[30] Foreign Application Priority Data

Nov. 12, 1975 [DE] Fed. Rep. of Germany ....... 2550729

[51] Int. Cl.² .............................................. E21C 27/34
[52] U.S. Cl. ...................................... 299/43; 104/194
[58] Field of Search ........................ 299/32, 34, 43–45; 191/25; 104/194

[56] References Cited

U.S. PATENT DOCUMENTS

| | | | |
|---|---|---|---|
| 3,113,763 | 12/1963 | Wendt et al. ........................... | 299/43 |
| 3,784,256 | 1/1974 | Katlic ..................................... | 299/43 |
| 4,025,118 | 5/1977 | Lanfermann et al. ................. | 299/43 |

FOREIGN PATENT DOCUMENTS 1,389,736  4/1975  United Kingdom ...................... 299/43

*Primary Examiner*—Ernest R. Purser
*Attorney, Agent, or Firm*—Thomas H. Murray

[57] ABSTRACT

A spill-plate housing protectively encloses a cable carriage including a pulley to form a reverse bend in a cable having one end connected to a mining machine while the cable extends along the internal duct in the housing. A tension reel includes a rope coupled to the cable carriage for advancing movement thereof within the spill-plate housing. The tension reel is supported at the end of the spill-plate housing opposite the end thereof from which the cable emerges. The cable includes an electrical power cable and hose which are separately carried by grooves in the pulley which may consist of two separate pulleys.

10 Claims, 5 Drawing Figures

CABLE CARRIAGE AND SPILL-PLATE HOUSING ASSEMBLY FOR A MINING MACHINE

BACKGROUND OF THE INVENTION

This invention relates to a cable carriage coupled by a rope to a tensioning member for horizontal movement along a course of travel at one side and generally parallel with the course of travel of a mining machine while a pulley mounted for rotation on the carriage supports a return loop in one or more cables, all of which are located within a protective duct in a spill-plate housing. More particularly, the present invention relates to such a cable carriage employed to tension, in loop-form, a cable supported by a pulley on the carriage while one end of the cable is secured to a getting machine, particularly a drum-cutter mining machine.

It is known in the art to employ spill-plates which are mounted at the slow side onto the wall surface of a face conveyor. The side of the spill-plate facing away from the face conveyor has been provided with a trough-shaped duct which is open at its top and adapted to accommodate a cutter line cable and a water line conduit or a cable chain which surrounds these members.

A spill-plate or "side bracket" is also known in the art wherein a cutter line or cable chain is received within an internal chamber to provide sufficient space so that the line or cable chain is contained wholly within the chamber. An extension from the mining machine passes through a normally-closed slot into the interior of the spill-plate or side bracket. This extension opens out of the slot only in the region where the cutter line emerges from the slot which is situated on the working face side of the spill-plate and extends along the entire length of the spill-plate. The cutter line extends to the drum-cutting mining machine which moves along the spill-plate by its course of travel. Spill-plates or side brackets of this construction which accommodate the cutter lines and water hoses along their entire length have a low overall height which does not permit double-looping of the cutter line such as would occur due to an interruption of the winning operation with a subsequent reversal to the direction of traversing motion by the mining machine.

It is also known in the art as shown, for example, in West German Pat. Nos. 1,190,907 and 1,156,039 to provide cable carriages which are guided on the face conveyor or a guide rail of the spill-plate so as to be slideable in the longitudinal direction of the face conveyor. Such carriages support a loop in a drum-cutter line or a cable chain by means of a pulley. The carriages are connected by a rope to a reel situated at the end of the face conveyor for pulling the cable carriages toward it and, therefore, constantly maintain the cutter line or the cable under tension irrespective of the direction of travel by the getting machine which is to be supplied with electrical energy transmitted through the cable. Not only the drum-cutter line or the cable chain, but also the rope which connects the reel to the cable carriage are at least partially or even completely exposed in the area of the face conveyor and the working face of the mine. This obstructs the getting operation; represents a source of accidents and exposes, unnecessarily, the parts to possible damage. Moreover, the cable carriage which moves with a reciprocating motion along the face conveyor or on the spill-plate, always represents an obstruction to which special attention must be paid by operators since it moves in unison with the getting machine.

SUMMARY OF THE INVENTION

It is an object of the present invention to arrange a cable carriage and associated tensioning means so that the getting operation is not obstructed through the provision of and movement by such a cable carriage.

It is still another object of the present invention to provide a cable carriage protected within a spill-plate housing for guided parallel movement along one side of the course of travel by a mining machine while the cable carriage is maintained under a desired tension by means arranged at one end of the course of travel by the carriage.

According to the present invention, there is provided in a spill-plate apparatus adapted to extend along one side of the course of travel by a mining machine having cutter means for releasing material from the mine face, a combination of elements including a cable having one end connected to the mining machine while the cable extends along one side of the course of travel by the mining machine, a spill-plate housing defining an internal cable duct adapted to protectively enclose at least a portion of the extended length of the cable, a cable carriage protectively arranged within the spill-plate housing for guided movement along one side of the course of travel by the mining machine, a pulley supported by the cable carriage for rotation about a horizontal axis, the cable being trained about the pulley to form a return cable loop which is guided and tensioned by the cable carriage, and a tension reel means including a rope coupled to the cable carriage wheel extending within the spill-plate housing from one end thereof.

Thus, according to the present invention, a cable carriage which is connected by a rope to a tensioning means arranged at one end of the mine face is guided in a spill-plate housing and provided with a pulley adapted to rotate about a horizontal axis. The pulley is employed to guide the cable in a looped-configuration and tensions the cable while disposed within the internal cable duct of the spill-plate housing. Such a cutter line and/or water hose which is situated within the duct of the spill-plate housing is associated with a getting machine and more particularly a drum-cutter mining machine. The present invention provides apparatus to insure that the cable carriage which traverses along in a longitudinal direction of the mine face and the rope coupled to the tensioning element is disposed within the cable duct of the spill-plate housing. By arranging the cable carriage in this manner, it is protectively housed within the spill-plate housing and does not obstruct access to the face conveyor and, therefore, does not obstruct the actual getting operation. Since the drum-cutter line and, therefore, the water hose are always maintained under tension and taut irrespective of the prevailing direction at which the mining machine is traveling during the winning operation, it follows that the course of travel by the getting machine may be altered at will without producing double loops to the drum cutter line or to the water hose. Accordingly, it is only the looped diameter of the line or hose which defines the required internal height that is necessary within the spill-plate housing to protectively accommodate it, thus insuring that side plate housings embodying the features of the present invention are suitable for use with mine seams having a relatively small thickness.

The spill-plate housing is conveniently provided with rails with an angular or L-shaped configuration to guide the cable carriage horizontally and vertically. The cable carriage may further include skids or rollers to perform the desired horizontal and vertical guiding functions within the spill-plate housing.

It is also desirable that the pulley of the cable carriage which guides the drum-cutter line and water hose in a looped configuration is provided with two adjacently-disposed, semicircular grooves about the circumference of the pulley. These grooves are adapted to the radius of the drum-cutter line and to the radius of the water hose. The radii of the grooves are struck at equal distance points from the rotational axis of the pulley. In a modified embodiment of the present invention, the pulley includes two coaxial pulley parts which are rotatably supported independently of one another. One pulley part is used to accommodate the loop in the drum-cutter line, while the other pulley part is used to accommodate the loop in the water line.

These features and advantages of the present invention as well as others will be more fully understood when the following description is read in light of the accompanying drawings, in which.

Figure 1:
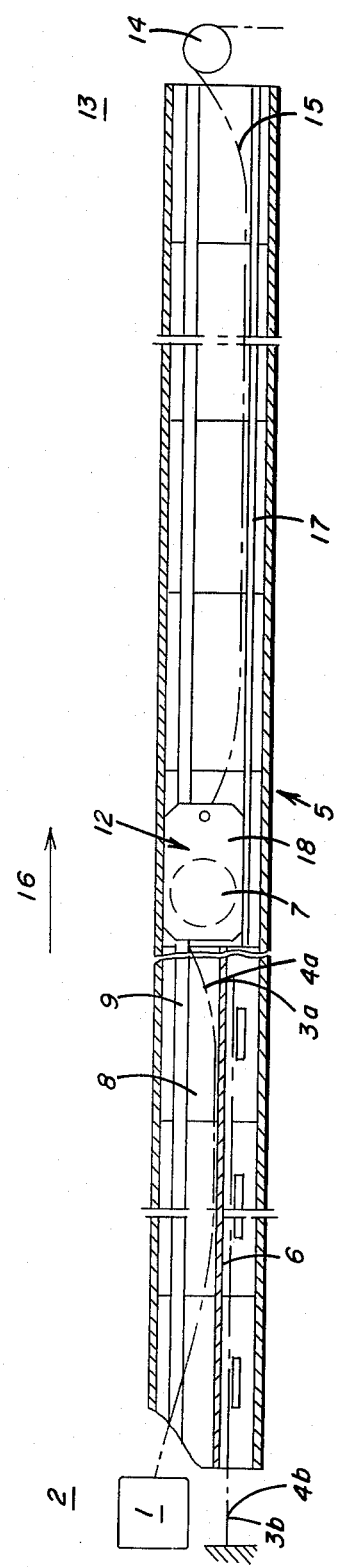
FIG. 1 is an elevational view, in section, through a plane in a side spill-plate apparatus to illustrate the cable carriage and arrangement of associated parts according to the present invention.

In FIG. 1, there is illustrated diagrammatically a drum-cutter mining machine 1 adapted for traversing movement in the usual well-known manner along the entire length of the working face of a face conveyor when arranged to extend along a mine face. The manner in which a drum-cutter mining machine is supported for movement along a face conveyor is disclosed in co-pending application Ser. No. 636,306, now U.S. Pat. No. 4,025,118 and assigned to the same Assignee as this application. The drum-cutter mining machine propels itself by an onboard motor along the working face through the continuous supply of electrical energy by a cable 3. Cooling and rinsing liquid, such as water, is supplied onboard the mining machine by a hose 4. The cable 3 and hose 4 have a length corresponding to the distance along which the mining machine 1 is traversed. The cable and hose are disposed within a spill-plate housing 5 which is mounted onto the wall of the face conveyor at the stow side thereof. As illustrated in FIG. 1, the cable 3 and hose 4 pass along a bottom integral cable duct 6 formed by the structural parts of the spill-plate housing 5. The cable and hose are installed in a fixed manner from the point of entry into the spill-plate housing along one-half of its length to the longitudinal midpoint of the traversing distance by the mining machine. At this midpoint, the cable 3 and hose 4 emerge from the bottom cable duct 6 and separately pass about outer peripheral grooves formed in a pulley 7. The cable portion 3A and hose portion 4A are of equal length and movable within a top spill-plate duct 8. A support arm projects from the mining machine 1 through a slot 9 at the working face side of the spill-plate housing. The slot 9 is normally closed by two spaced-apart rubber strips 11 which permit the passage of the arm through the slot 9 into the top duct 8. The rubber strips 11 are secured to the spill-plate housing by fastener means, such as bolts 10 shown in FIG. 3.

The pulley 7 guides the cable 3 and hose 4 in a looped form. The pulley 7 is part of a cable carriage 12 which is situated entirely within the top spill-plate housing duct 8 and protected by the spill-plate housing during traversing movement along the duct. The cable carriage 12 is maintained under tension by a reel or winch 14 which is permanently biased at its installed location along the face 13 and coupled by a rope 15 to the carriage. When the drum-cutter mining machine 1 moves along in a direction indicated by arrow 16 (FIG. 1), the cable carriage is caused to move in the same direction but at one-half the speed at which the drum-cutter mining machine is moved. The movement of the carriage is under an applied tension force by rope 15 which extends along the duct 8. The movable cable portion 3A and hose portion 4A, situated between the cable carriage 12 and the drum-cutter mining machine 1, are therefore constantly shortened as the mining machine approaches the end point of traversing movement. This avoids the formation of double loops in the cable and hose when the traversing direction of the drum-cutter mining machine 1 is changed.

Figure 3:
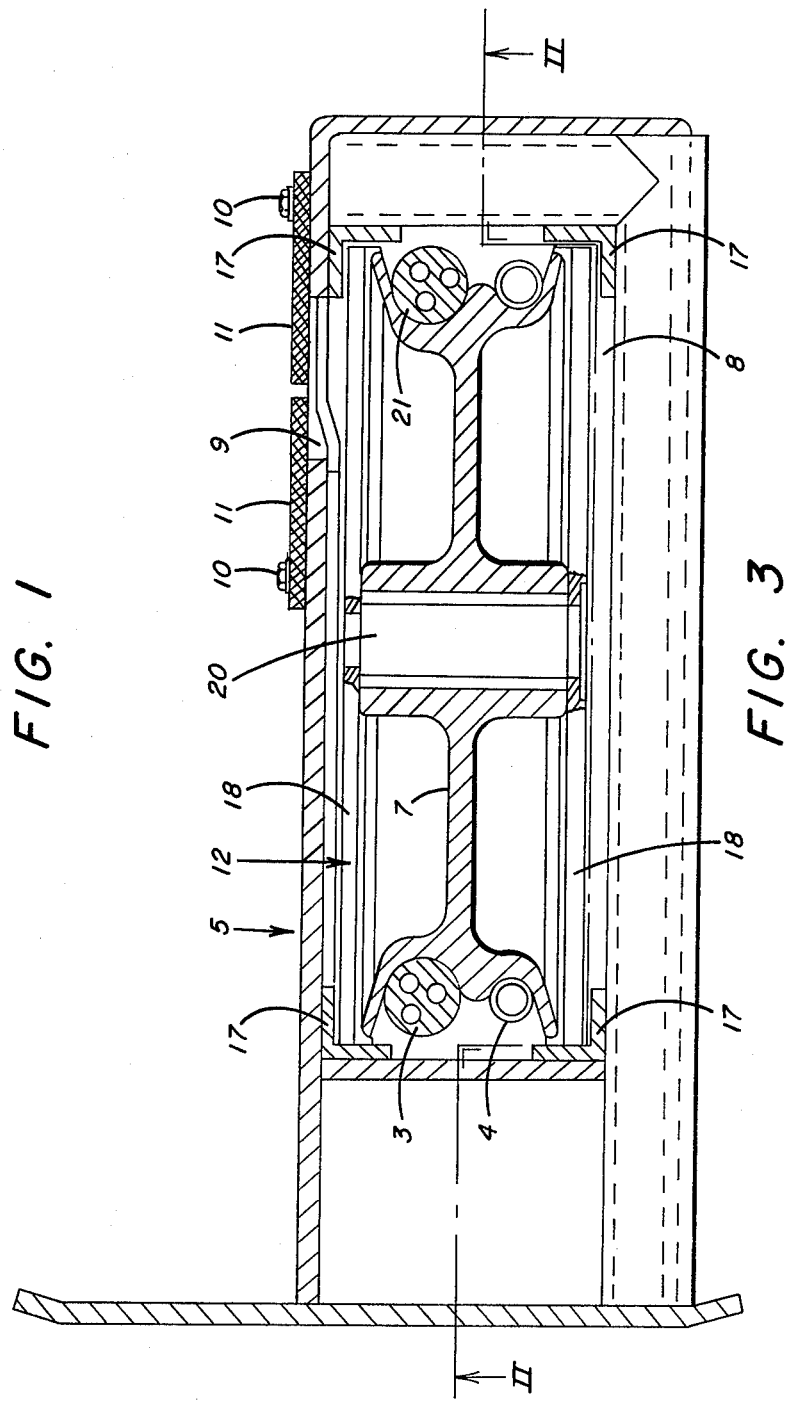
FIG. 3 is a sectional view taken along line III—III of FIG. 2.
Figure 2:
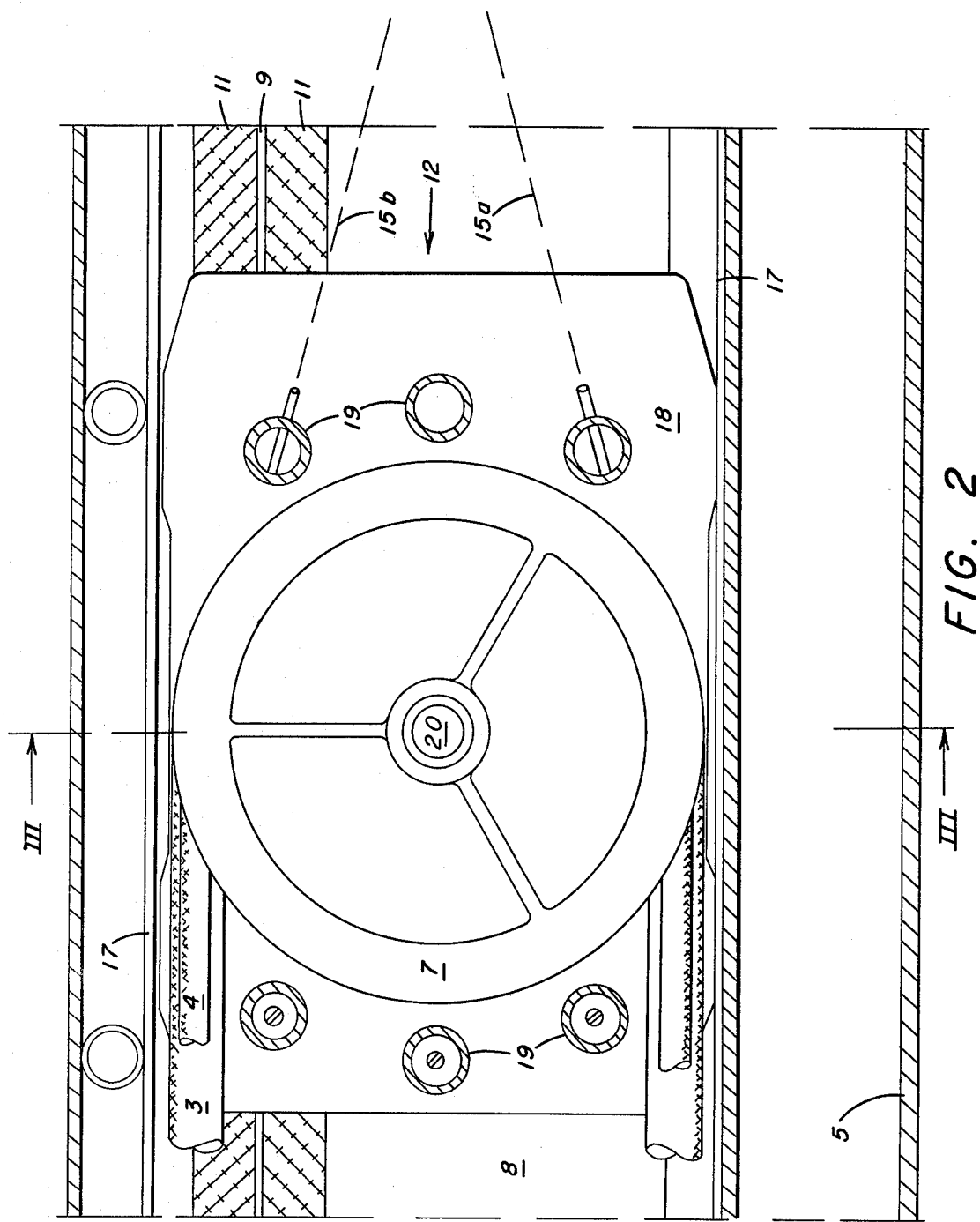
FIG. 2 is an enlarged elevational view of the cable carriage shown in FIG. 1 and taken along line II—II of FIG. 3.
Figure 4:
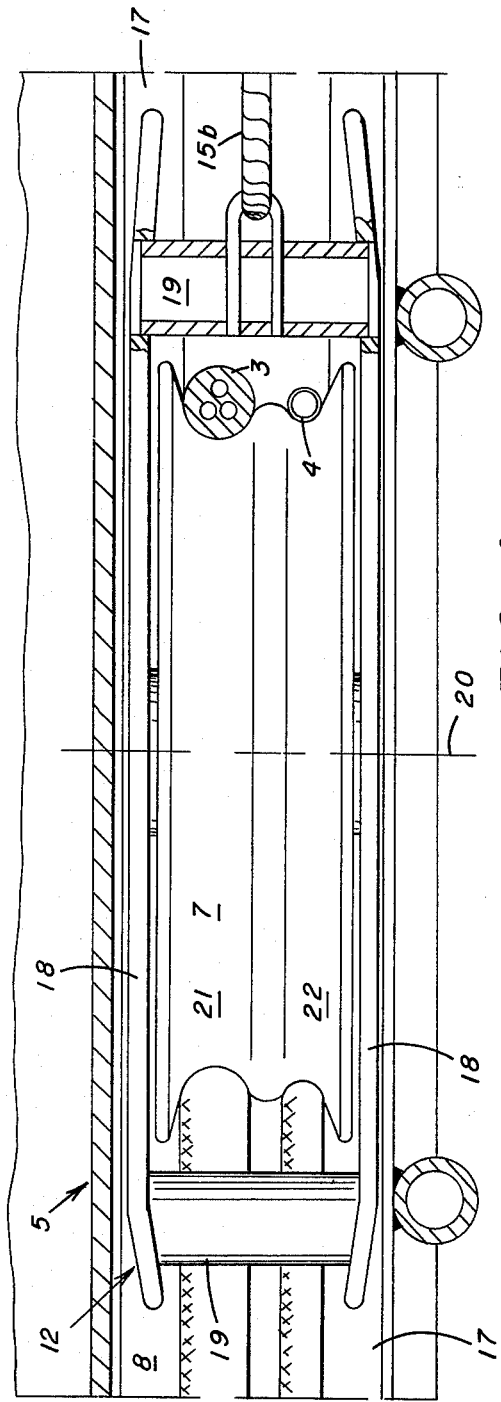
FIG. 4 is an enlarged plan view of the cable carriage shown in FIGS. 1-3.

As shown in FIGS. 2-4, the spill-plate housing duct 8 includes four L-shaped angle irons 17 which are spaced apart and arranged parallel to extend along the entire length of one portion of the spill-plate housing. The horizontal leg portions of angle irons 17 support and guide the cable carriage in the horizontal as well as the vertical direction. The cable carriage 12 includes two plates 18 having curved or converging ends that form skids at the leading and trailing portions of the cable carriage in regard to its direction of traversing movement. The plates 18 are joined together so as to form a frame by short lengths of tubular members 19 that are either fixed by welding or detachably mounted between the plates by bolts. The plates enclose the pulley 7 between them while situated on the horizontally-arranged legs of the bottom angle irons 17. A pulley shaft 20 is secured to plates 18 in a fixed manner for supporting by relative rotation the pulley 7.

In the embodiment illustrated in FIGS. 1-4, the pulley includes two adjacently-located, circumferential grooves 21 and 22, one of which is adapted to the radius of the cable 3 and the other is adapted to the radius of the hose 4. The radii of the circumferential grooves 21 and 22 are located at equal distance points from the rotational axis of pulley shaft 20. The rope 15 is coupled through two short rope sections 15A and 15B to the top and bottom tubular members 19 which are part of the tubular members used to join together the side plates of the cable carriage 12. The entire length of the rope 15 in the spill-plate housing is situated within the duct 8.

Figure 5:
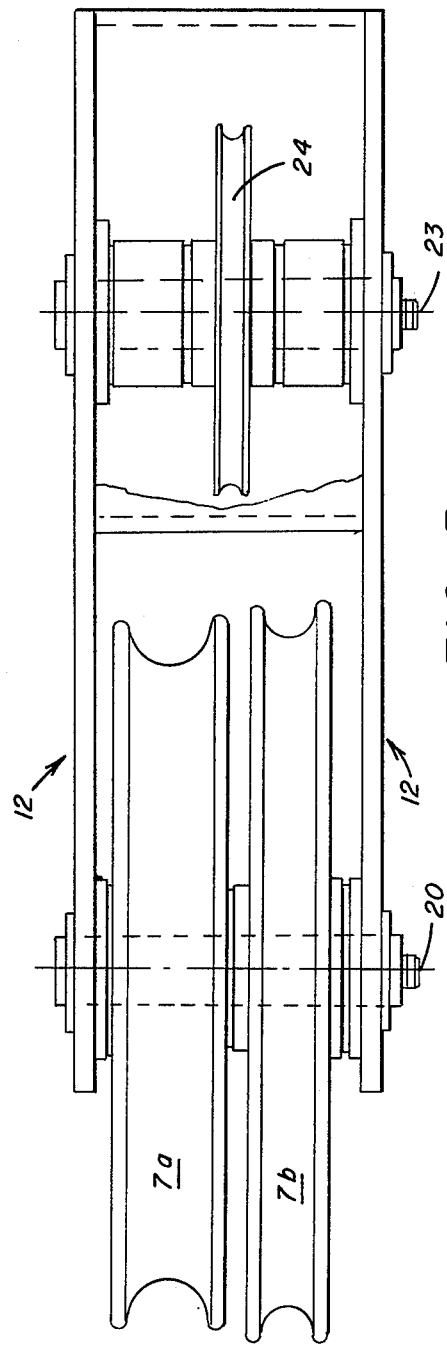
FIG. 5 is a view similar to FIG. 5 but illustrating a modified form of the cable carriage of the present invention.

By a second embodiment illustrated in FIG. 5, the cable carriage 12 supports two coaxially-arranged pulleys 7A and 7B which are supported in a side-by-side manner between the side plates of the carriage. The pulley 7A guides the loop formed in the cable line by its passage about the outer periphery thereof and the pulley 7B supports the loop in the water line by its passage about the outer periphery thereof. In this embodiment of the present invention, the cable carriage 12 is provided with a rope sheave 24 supported by a shaft extending between the side plates for rotation about axis 23. The sheave 24 is surrounded by the rope 15 which is connected to the reel or winch 14.

The spill-plate housing 5 shown in FIG. 1 is preferably made up of two different types of spill-plate housing sections, namely, a first spill-plate housing section 5A which accommodates the cable members in an immovable manner by installing them within the bottom cable duct 6 up to the mid-portion of the mine face. A second spill-plate section 5B adjoins the spill-plate section 5A. The cable carriage is traversed only along the spill-plate section 5B. For the greatest part of the traversing movement, the carriage is not adjacent the mining machine. This enhances protection of the carriage while completely located within the spill-plate housing. This feature of the present invention is particularly useful when the spill-plate housing 5 is used in mines where coal seams are inclined at large angles between the immovable length of cable portion 3B, extending within duct 6 as far as the middle portion of the face, is secured in its position by a cross section of the duct. It is, of course, also possible to assemble the spill-plate housing from only one of the two different forms of housing sections 5A and 5B. Preference, however, is given to the spill-plate housing section 5B without any separate duct for the cable portion 3B which is installed as far as the mid-portion of the face, more particularly in conditions or mine environments where the floor is relatively level.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a spill-plate apparatus adapted to extend along at one side of the course of travel by a mining machine having cutter means for releasing material from the mine face, the combination including:
   a cable having an end connected to said mining machine while the cable extends along at one side of the course of travel by the mining machine,
   a spill-plate housing defining an internal cable duct adapted to protectively enclose at least a portion of the extended length of said cable, said spill-plate housing having a slot along the length thereof to pass said cable for connection to said mining machine,
   cover means normally closing that slot in said spill-plate housing while permitting the end of the cable to pass to the mining machine while moving along the course of travel,
   a cable carriage protectively enclosed within said spill-plate housing for guided movement along said one side of the course of travel by the mining machine,
   a pulley supported by said cable carriage for rotating about a horizontal axis, said cable being trained about said pulley to form a return cable loop which is guided and tensioned by said cable carriage, and
   a tension reel means including a rope coupled to said cable carriage while extending within said spill-plate housing from one end thereof.

2. The combination according to claim 1 further including rails supported by said spill-plate housing to guide said cable carriage for horizontal traversing movement within the spill-plate housing.

3. The combination according to claim 1 further including guide rails having an L-shaped cross section extending along the internal cable duct of said spill-plate housing for horizontal and vertical guiding of said cable carriage.

4. The combination according to claim 1 wherein said cable carriage further includes guide means for horizontal and vertical guided movement along said spill-plate housing.

5. The combination according to claim 4 wherein said guide means include skid surfaces defined on said cable carriage.

6. The combination according to claim 4 wherein said guide means include rollers supported by said cable carriage.

7. The combination according to claim 1 wherein said cable includes a power supply cable and fluid-conducting hose separate from one another and individually carried by one of two semicircular grooves in said pulley.

8. The combination according to claim 7 wherein said pulley includes side-by-side, semicircular grooves extending about the circumferential face of the pulley, the radii of said semicircular grooves extending from points that are equally distant from the rotational axis of said pulley.

9. The combination according to claim 7 wherein said pulley consists of two separate pulley members independently supported for coaxial rotation.

10. The combination according to claim 1 wherein said cable carriage includes side plates secured together by spacer members to support and extend along opposite sides of said pulley.

* * * * *